United States Patent [19]

Taylor et al.

[11] Patent Number: 4,958,910
[45] Date of Patent: Sep. 25, 1990

[54] RADIATION PULSE GENERATION

[75] Inventors: James R. Taylor, London, Great Britain; Anderson S. L. Gomes, Recife; Artur D. Gouveia-Neto, Maecio, both of Brazil

[73] Assignee: British Telecommunications public limited company, Great Britain

[21] Appl. No.: 282,219

[22] PCT Filed: Mar. 31, 1988

[86] PCT No.: PCT/GB88/00260
  § 371 Date: Jan. 31, 1989
  § 102(e) Date: Jan. 31, 1989

[87] PCT Pub. No.: WO88/08150
  PCT Pub. Date: Oct. 20, 1988

[30] Foreign Application Priority Data

Apr. 6, 1987 [GB] United Kingdom ............... 8708148

[51] Int. Cl.$^5$ .................. G02B 27/00; G02B 6/26
[52] U.S. Cl. .................. 350/321; 350/96.15; 350/320; 356/44; 307/425
[58] Field of Search ............ 350/321, 320, 1.1, 311, 350/96.15, 96.16, 96.29, 401; 250/493.1, 503.1, 504 R; 356/44; 307/425

[56] References Cited

U.S. PATENT DOCUMENTS

| | | | |
|---|---|---|---|
| 4,560,246 | 12/1985 | Cotter | 350/96.16 |
| 4,804,264 | 2/1989 | Kirchhofer et al. | 356/44 |
| 4,812,682 | 3/1989 | Holmes | 307/425 |
| 4,815,804 | 3/1989 | Desurvire et al. | 350/96.15 |
| 4,823,166 | 4/1989 | Hartog et al. | 356/44 |

OTHER PUBLICATIONS

Conference on Lasers and Electro-Optics, 21–24, May 1985, Baltimore, Md., OSA/IEEE (U.S.), pp. 80–81, L. F. Mollenauer et al.: "Experimental Demonstration of Soliton Propagation in Long Fibers": Loss Compensated by Raman Gain.

IEEE Journal of Quantum Electronics, vol. QE-22, No. 12, Dec. 1986, IEEE (New York, U.S.) F. M. Mitschke et al: "Stabilizing the Soliton Laser", pp. 2242–2250.

IEEE Journal of Quantum Electronics, vol. QE-11, No. 13, Mar. 1975 IEEE (New York, U.S.) R. H. Stolen: "Phase-Matched-Stimulated Four-Photon Mixing in Silicafiber Waveguides", pp. 100–103.

Soviet Physics, JEPT, vol. 62, No. 3, Sep. 1985, (New York, U.S.), E. M. Dianov et al: "Generation of Ultrashort Pulses by Spectral Filtering During Stimulated Raman Scattering in an Optical Fiber"; pp. 448–455.

Optics Letters, Mar. 1987, vol. 12, No. 3, Kafka et al: "Fiber Raman Soliton Laser Pumped by a ND:YAG Laser"; pp. 181–183.

Tuesday Poster/Afternoon; Jun. 1986, Islam et al article: "Fiber Raman Amplification Soliton Laser"; pp. 76–77.

Primary Examiner—Bruce Y. Arnold
Assistant Examiner—Loha Ben
Attorney, Agent, or Firm—Nixon & Vanderhye

[57] ABSTRACT

A radiation pulse generating assembly comprises a radiation generator such as a laser for generating pulses of radiation having pulse widths in the order of pico seconds. The pulses from the generator are coupled onto an optical fiber which causes the pulses to undergo Raman scattering to generate reduced width pulses with wavelengths lying within a Raman spectrum and having widths in the order of femto seconds. A first filter filters out the initial pump wavelength while a second filter downstream of the first filter is tunable to select reduced width pulses within a desired wavelength band.

8 Claims, 4 Drawing Sheets

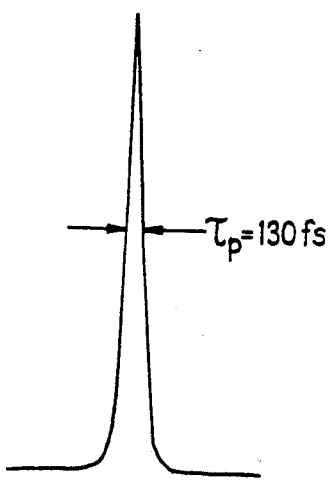
FIG.5(a) $\tau_p = 130\,fs$
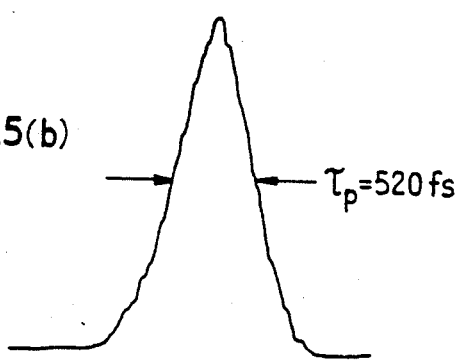
FIG.5(b) $\tau_p = 520\,fs$
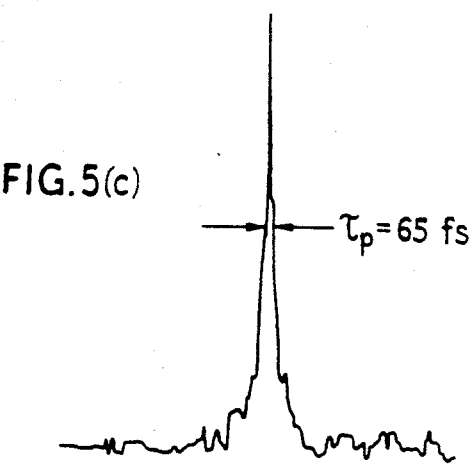
FIG.5(c) $\tau_p = 65\,fs$

RADIATION PULSE GENERATION

The invention relates to apparatus and methods for generating pulses of radiation.

In the field of optical communications, there is a continuing need to compress optical pulses from those generated by conventional lasers which typically have durations in the order of 100 ps.

In a paper entitled "Fibre Raman soliton laser pumped by a Nd:YAG laser" Optics Letters, vol 12, no. 3, Mar. 1987 pp 181–183, a completely integrated oscillator loop is disclosed which is pumped with 100 ps pulses and provides output pulses as a result of Raman scattering in and optical fibre with pulse widths in the order of 190 fs. One of the drawbacks of this system is the need for an optical loop of closely controlled length and the additional complications of providing feedback.

In accordance with one aspect of the present invention, a radiation pulse generating assembly comprises a radiation generator for generating pulses of radiation; a waveguide into which pulses of radiation at working intensities from the radiation generator are coupled, the waveguide causing the radiation pulses to undergo Ramon scattering to generate reduced width pulses with wavelengths lying within a Raman spectrum; and filtering means into which the reduced width pulses are coupled for selecting reduced width pulses within a desired wavelength band.

In accordance with a second aspect of the present invention, a method of generating pulses of radiation comprises coupling first pulses of radiation at working intensities into a waveguide, the waveguide causing the first pulses to undergo Raman scattering to generate reduced width pulses with wavelengths lying within a Raman spectrum; and selecting those reduced width pulses which have wavelengths lying within a desired wavelength band.

We have discovered surprisingly that pulses with wavelengths within the Raman spectrum have a high degree of coherence so that the phases of the different frequency components are substantially mode locked. Thus in real time the Raman pulse width is given approximately by the inverse of the spectral width. Furthermore, the pulses are extremely stable which is a consequence of the fact that they are non-linear solitary waves which have been amplified and compressed in the generation process.

In contrast to the known arrangement for pulse width reduction described above, our system is a single pass system without feedback, thus simplifying the overall structure. Furthermore, in our system, unlike the known system, it is possible to select pulses with a desired wavelength. The advantage of a single pass system is that the radiation generator can produce an arbitrary sequence of pulses whereas in the previous case the pulses must be generated at a closely controlled frequency.

The waveguide will comprise a non-linear medium in order to cause the incoming pulses to undergo Raman scattering and conveniently the medium should have a broad Raman gain spectrum. The medium should support non-linear solitary waves at the wavelengths within the Raman spectrum.

Preferably, the continuous wave is unstable with respect to the formation of side bands at wavelengths shorter than the Raman gain peak. This condition leads to a lowering of the threshold for the Raman process to begin, thus enabling lower power sources to be used.

Preferably, the filtering means comprises a first filter into which pulses from the waveguide are coupled, the first filter being adapted to pass at least some (preferably all) of the Raman wavelengths but to reject the wavelength of the original pulses from the radiation generator; and a second filter downstream of the first filter with a bandwidth smaller than the width of the Raman spectrum and a centre wavelength tunable over at least part of the range of the Raman spectrum.

Preferably, the assembly further comprises one or more additional waveguides between the one waveguide and the filtering means, the additional waveguide receiving the reduced width pulses and causing the pulses to undergo Raman scattering whereby the pulse widths are compressed.

The invention is particular suited to the compression of optical pulses with the or each waveguide conveniently comprising a monomode optical fiber such as a silica optical fiber. In this case, the radiation generator conveniently comprises a laser such as a Nd:YAG laser.

In this context, the term "optical" is intended to refer to that part of the electromagnetic spectrum which is generally known as the visible region together with those parts of the infrared and ultraviolet regions at each end of the visible region which are capable of being transmitted by dielectric optical waveguides such as optical fibers.

An example of an assembly and method for generating radiation pulses in accordance with the present invention will now be described with reference to the accompanying drawings, in which.

Figure 4:
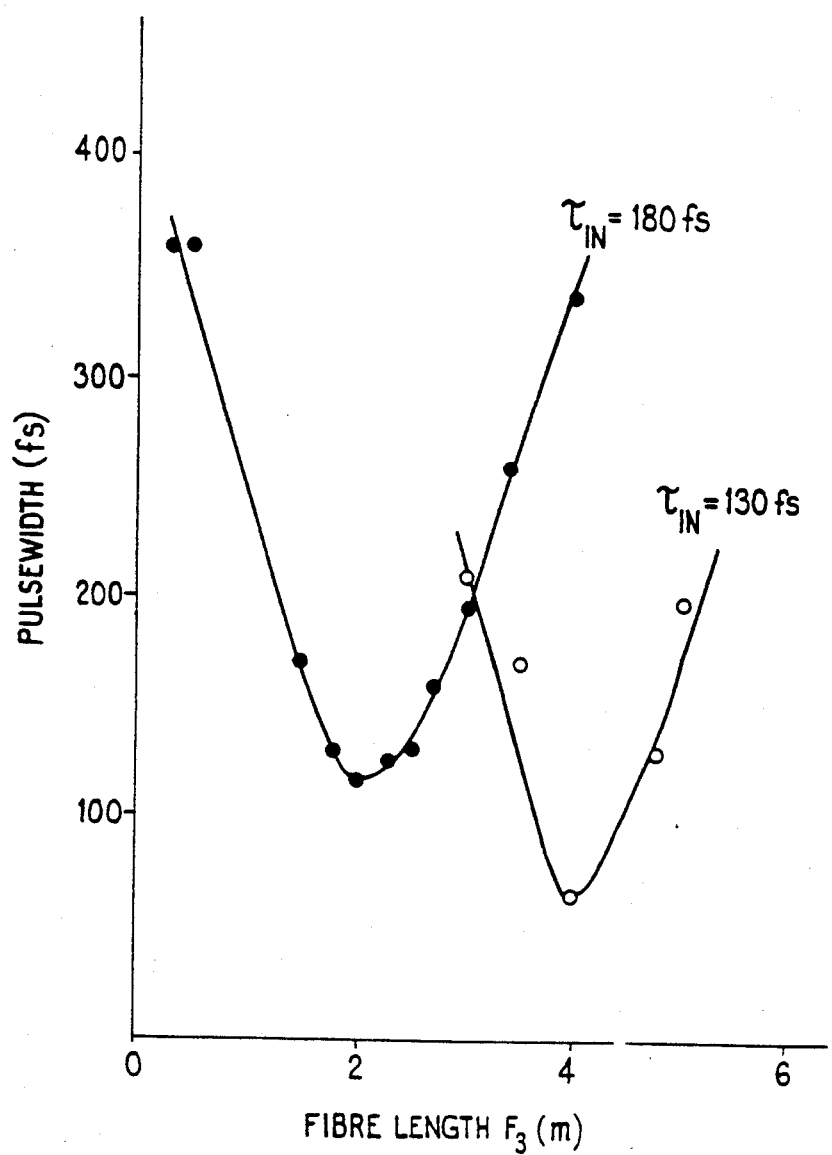

FIG. 4 illustrates optimization curves of fiber length $F_3$ in the fiber compressor, with $F_2$ fixed at 2 m, for fiber lengths $F_1$ of 500 m and 300 m which represent different input pulse widths to the compressor of 180 fs and 130 fs respectively; and, FIG. 5 illustrates autocorrelation traces of (a) 130 fs pulse exiting fiber $F_1$, (b) 520 fs pulse exiting fiber $F_2$, and (c) overall compressed pulse of 65 fs exiting $F_3$.

Figure 1:
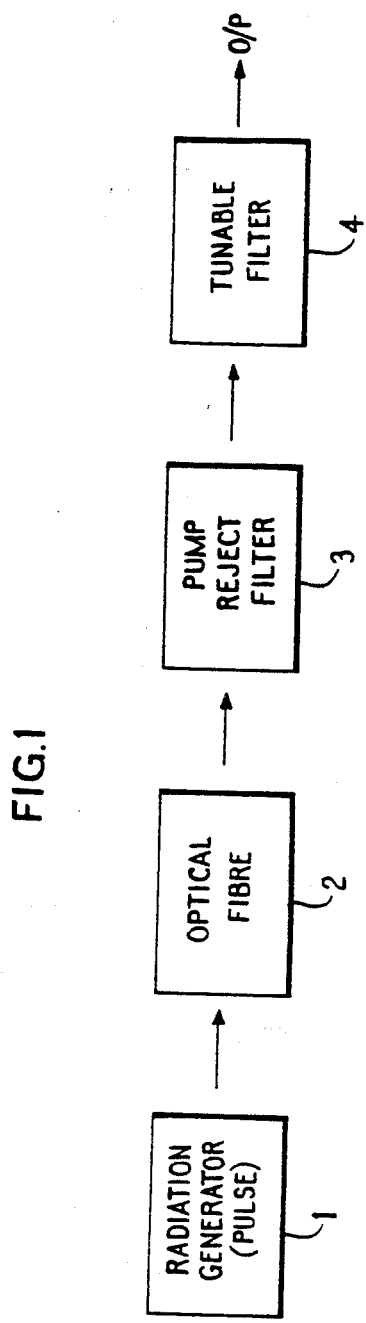
FIG. 1 is a block diagram of the radiation pulse generating assembly.

FIG. 1 illustrates a radiation generator 1 such as a cw mode locked Nd: YAG laser which generates pulses with a wavelength of 1.32 μm, each having a pulse width of 90 ps at a 100 MHz repetition rate, with an average power of 1.8 W. The pulses from the laser 1 are coupled into a monomode optical fiber 2 which has an anomalous dispersion at and above 1.32 μm. The stimulated Raman spectrum in a glass matrix is broad (approximately 100 nm) with a wavelength shift of about 440 $cm^{-1}$. The result of Raman scattering within the optical fiber 2 is the generation of optical pulses having much narrower pulse widths, on the order of 30 fs. These narrowed pulses are coupled into a first optical filter 3 which filters out the original pump wavelengths from the laser 1 and the filtered, narrow pulses are coupled into a second, tunable filter 4 which has a bandwidth smaller than the width of the Raman spectrum and a centre wavelength tunable over the range of the Raman spectrum. Thus, the output pulse wavelength can be selected by suitably tuning the filter 4.

Figure 3:
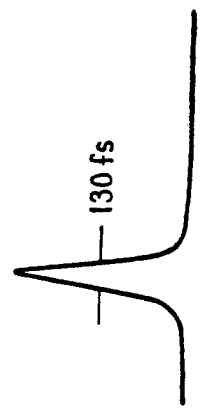
FIG. 3 illustrates graphically the background free autocorrelation of the soliton-Raman pulses exiting fiber $F_1$ in FIG. 2.
Figure 2:
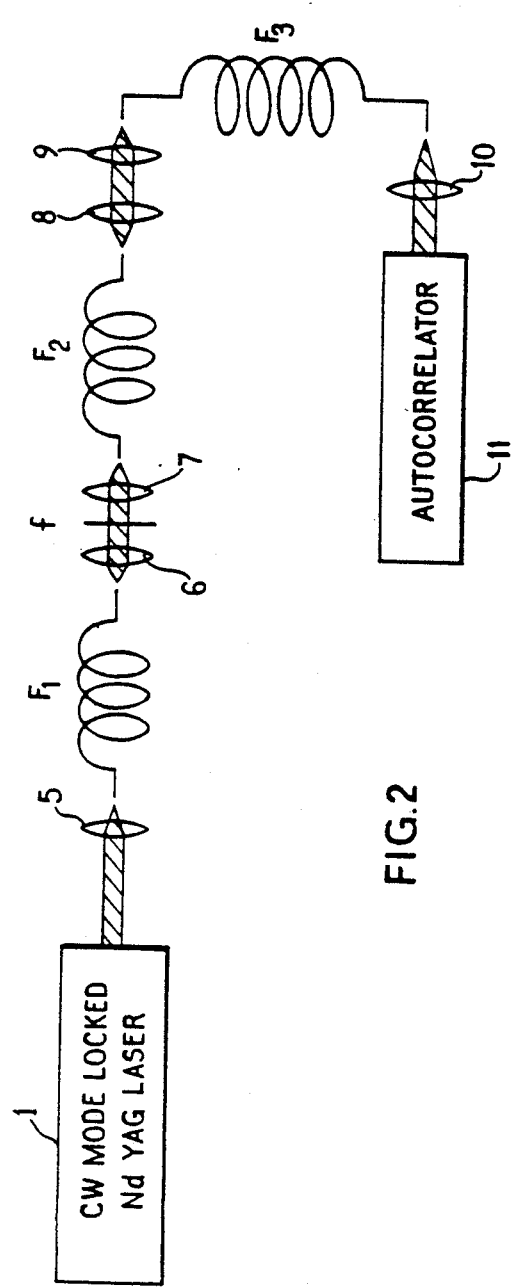
FIG. 2 illustrates an experimental arrangement to demonstrate the invention.

FIG. 2 illustrates in more detail an arrangement similar to that shown in FIG. 1 but adapted for experimental use. The output pulses from the laser 1 are coupled, using an uncoated ×20 microscope objective 5, with 50% efficiency, into a standard single mode at 1.32 μm, non-polarization preserving optical fiber ($F_1$), which has a dispersion minimum in the region of 1.32 μm. Through multisoliton-Raman generation, highly temporally compressed, stable trains of pulses are generated with a bandwidth extending from just above 1.32 μm to beyond 1.45 μm. The generated soliton-Raman pulsewidth is a function of the fiber length and peak pump pulse power for a fixed pump pulsewidth. Typically for a 300 m fiber ($F_1$) length, with 800 mW average pump power, 130 fs pulses with high amplitude stability (<1% fluctuation) and 400 mW average power in the Raman band are generated. FIG. 3 shows a "real time" trace of a scanning background free autocorrelation trace taken over a long exposure time, clearly indicating the high stability of the 130 fs soliton Raman pulses.

A non-soliton component of the compressed pulse is dependent on the experimental parameters of fiber length and pump power. For the case of $F_1 \sim 300$ m, only 10% of the output energy was in the 130 fs soliton pulse, corresponding to a peak power of about 3 kW. By using polarization selection however, it is possible to reach the situation where the broad non-soliton component can be rejected.

Radiation from the fibre $F_1$ is coupled via a lens 6 into a filter (f) which removes the fundamental (pump) radiation. The transmitted soliton-Raman signal is focussed by a lens 7 into a fiber $F_2$, the first stage of an all fibre compressor. This fiber $F_2$ is non-polarization preserving single mode at 1.32 μm with an effective 6 μm core diameter, a loss of <1 dB/Km and a dispersion minimum wavelength at 1.55 μm. At 1.4 μm the group velocity dispersion due to self phase modulation gives rise to a positive frequency chirp, as in the case of a conventional fiber-grating pair compressor.

The compressor has a negatively dispersive element, formed by a fibre $F_3$, which is again non-polarization preserving, single mode at 1.32 μm, with a core diameter of 9 μm, a dispersion of −11 ps/km.nm at 1.4 μm and a zero dispersion wavelength at 1.275 μm.

Coupling into and out of the fibers $F_2, F_3$ is achieved using uncoated microscope objectives 8,9,10 and the pulsewidth on exit from the fiber $F_3$ is examined using a background free autocorrelator 11, with a temporal resolution of better than 20 fs. An overall average power coupling efficiency for each stage (fiber and microscope objectives) of approximately 25% is typical.

For fixed input parameters of peak power and pulsewidth there exists for any particular wavelength an optimum fiber length $Z_{opt}$ of fiber $F_2$ to achieve maximum compression in the compressor. For our particular fiber parameters and input pulses, a fiber length of 0.5 m was predicted, and a compression ratio of times two. Experimentally, with a length of fiber $F_2$ of less than 1 m very little overall compression could by achieved. It was found empirically that in the situations where the input pulse experienced a temporal broadening of approximately 3 to 4 times compression could be achieved. For a length of fiber $F_2$ of 3 m the required broadening was obtained. In determining the optimum theoretical fiber length of fiber compressor it is assumed that the pulses entering the system are transform limited. However in the case of the single pass soliton-Raman pulses, this situation is far from being observed and an obvious chirp exists on the pulse. In the case of Raman generation the form of the chirp can take quite a complicated form, and a fiber length different from the theoretical optimum would be expected.

The degree of negative group delay required to compress the chirped pulses exiting fiber $F_2$ was also determined experimentally. Theoretically the compression would require diffraction grating separations of several millimeters, which is equivalent in dispersion to a fiber length of the order of a meter. The optimization was carried out as a "cut back" experiment on fiber $F_3$ initially several meters long, for several input pulse parameters. The result of this can be seen in FIG. 4. For a length of fiber $F_1$ of 500 m, the soliton Raman pulsewidth was 180 fs at an average pump power level of 700 mW. Fiber $F_2$ was maintained at 3 m and at a fiber length of 2 m for $F_3$, a minimum in the overall compressed pulsewidth of 120 fs was obtained. Above and below this length for fiber $F_3$, overall compression width increased. Similarly, with $F_1$ at 300 m, the soliton Raman pulsewidth was 130 fs and $F_3$ optimized around 4 m, with an average power in the pulses of 40 mW. FIG. 5 shows the autocorrelation traces obtained at each stage of the compression process. The soliton Raman pulse of 130 fs is shown in FIG. 5(a) which broadened to 520 fs FIG. 5(b)) in 3 m of fiber $F_2$, while FIG. 5(c) shows the autocorrelation of the finally compressed 65 fs pulse representing an overall compression of times two. However, not all the average power was contained in the compressed pulse. The original pedestal on the input soliton pulse was in evidence, and the compressed pulse contained only ∼10% of the average power, which represents a peak power in the 65 fs pulse of 1 kW.

We claim:

1. A radiation pulse generating assembly comprising: a radiation generator for generating pulses of radiation; a waveguide into which pulses of radiation at working intensities from the radiation generator are coupled, the waveguide causing the radiation pulses to undergo Raman scattering to generate reduced width pulses with wavelengths lying within a Raman spectrum; and filtering means into which the reduced width pulses are coupled for selecting reduced width pulses within a desired wavelength band.

2. An assembly according to claim 1, wherein the filtering means comprises
   a first filter into which pulses from the waveguide are coupled, the first filter being adapted to pass at least some of the wavelengths lying within said Raman spectrum but to reject wavelengths of original pulses from the radiation generator; and
   a second filter downstream of the first filter with a bandwidth smaller than the width of the Raman spectrum and a center wavelength tunable over at least part of the range of the Raman spectrum.

3. An assembly according to claim 1 or claim 2, further comprising one or more additional waveguides between the waveguide and the filtering means, the additional waveguides receiving the reduced width pulses and causing the pulses to undergo Raman scattering whereby the pulse widths are compressed.

4. An assembly according to claim 3, in which the waveguide and each additional waveguide comprise a monomode optical fiber.

5. An assembly according to claim 1 or 2, wherein the radiation generator generates optical pulses.

6. An assembly according to claim 5, wherein the waveguide comprises a monomode optical fiber.

7. An assembly according to claim 1 or 2, wherein the radiation pulses from the radiation generator have each a pulse width in the order of pico seconds and the reduced width pulses have each a width in the order of femto seconds.

8. A method of generating pulses of radiation, the method comprising coupling first pulses of radiation at working intensities into a waveguide, the waveguide causing the first pulses to undergo Raman scattering to generate reduced width pulses with wavelengths lying within a Raman sepctrum; and selecting those reduced width pulses which have wavelengths lying within a desired wavelength band.

* * * * *